United States Patent [19]

Bogdanovic

[11] Patent Number: 4,554,153
[45] Date of Patent: Nov. 19, 1985

[54] PROCESS FOR THE PRODUCTION OF MAGNESIUM HYDRIDES

[75] Inventor: Borislav Bogdanovic, Mülheim, Fed. Rep. of Germany

[73] Assignee: Studiengesellschaft Kohle mbH, Mulheim, Fed. Rep. of Germany

[21] Appl. No.: 626,819

[22] Filed: Jul. 2, 1984

Related U.S. Application Data

[63] Continuation-in-part of Ser. No. 433,078, Oct. 6, 1982, abandoned, which is a continuation-in-part of Ser. No. 187,907, Sep. 17, 1980, abandoned, which is a continuation of Ser. No. 8,739, Feb. 2, 1979, abandoned.

[30] Foreign Application Priority Data

Feb. 2, 1978 [DE] Fed. Rep. of Germany ....... 2804445

[51] Int. Cl.$^4$ .............................................. C01B 6/04
[52] U.S. Cl. ..................................... 423/647; 420/900
[58] Field of Search .......................... 423/647; 420/900

[56] References Cited

U.S. PATENT DOCUMENTS 3,030,184  4/1962  Faust et al. ......................... 423/647
3,485,585 12/1969  Snyder ................................ 423/647
3,617,218 11/1971  Tamelin et al. ..................... 423/647
3,666,416  5/1972  Henle et al. ........................ 423/647
4,242,315 12/1980  Bruning et al. .................... 423/647

FOREIGN PATENT DOCUMENTS 717261 10/1966 Italy .................................... 423/647

OTHER PUBLICATIONS

Ashley et al., "J. of Amer. Chem. Soc.", vol. 99, pp. 310–311, Jan. 1977.
Faust et al. (2), "J. Appl. Chem.", vol. 10, Apr. 1960, pp. 187–188.
Jezowska, "Chem. Absts.", vol. 85, 1976, #180094v.
Snyder et al., "Chem. Abstracts", vol. 69, 1968, #44943p.

Primary Examiner—H. T. Carter
Attorney, Agent, or Firm—Sprung, Horn, Kramer & Woods

[57] ABSTRACT

A process for the production of hydrides of magnesium, comprising reacting magnesium with hydrogen in the presence of magnesium.

9 Claims, No Drawings

PROCESS FOR THE PRODUCTION OF MAGNESIUM HYDRIDES

This application is a continuation-in-part of application Ser. No. 433,078, filed Oct. 6, 1982, which is a continuation-in-part of application Ser. No. 187,907, filed Sept. 17, 1980, which is a continuation of application Ser. No. 008,739, filed Feb. 2, 1979, all now abandoned.

The invention relates to a catalytic process for the preparation of magnesium hydrides under mild conditions. For the preparation of magnesium hydride by prior art methods, high reaction temperatures and pressures are generally required: 175° C./5 bar [in the presence of allyl iodide or iodine; J. P. Faust et al, J. Appl. Chem. (London) 10, 187 (1960)]; 140° to 170° C./135 bar [in the presence of AlEt$_3$; M. Mamula et al, Czech Pat. No. 139,589 (1966), C.A. 76, 87972 (1972)]; 150° C./200 bar [J. C. Snyder, U.S. Pat. No. 3,485,585 (1964), C.A. 72, 45603 (1970); TiCl$_3$ as catalyst; J. C. Synder, U.S. Pat. No. 3,387,948 (1962), C.A. 69, 44943 (1968)]; 350° C./24 bar (J. J. Reilly and R. H. Wiswall, Inorg. Chem., 2254, 1968); and 380° to 450° C./100 to 200 bar [T. N. Dymova et al, Zhur. Neorg. Khim. 6, 763 (1961), C.A. 55 23144 (1961)].

The formation of MgH$_2$ from magnesiun and H$_2$ in the presence of VCl$_4$ as catalyst in tetrahydrofuran at 20° C./1 bar has been described by B. Jezowska-Trzebiatowska et al. [Bull, Acad. Pol. Sci., Ser. Sci. Chim. 1976, 24 (4), 331; C.A. 85, 180094 (1976)] However, the catalytic activity of this system drops off so markedly even after a few catalytic steps that industrial production of MgH$_2$ by this route is impractical. According to E. C. Ashby and A. B. Goel [J. Amer. Chem. Soc. 99, 310 (1977)], halomagnesium hydrides soluble in THF could heretofore be produced only by reacting a magnesium hydride obtained from dialkyl or diaryl magnesium and LiAlH$_4$ with magnesium halides.

For the production of magnesium hydrides by the process in accordance with the invention, metallic magnesium is reacted with hydrogen in the presence of a halide of a transition metal of the fourth to eighth subgroup of the periodic system and an organo-magnesium compound or magnesium hydride or a polycyclic aromatic or a tertiary amine and a magnesium halide. Preferred transition metal compounds are chromium, iron and titanium halides.

The magnesium halide can be employed in catalytic amount relative to magnesium, in which event the magnesium product will be substantially "pure" magnesium hydride. If larger amounts of magnesium halide are employed, the resulting magnesium hydride will include halide in substantial amount, probably present as halo-magnesium hydrides. If the magnesium halide is present in stoichiometric amount relative to the magnesium to be hydrogenated, substantially each molecule of product will contain halide. Beyond stoichiometric amounts of magnesium halide:magnesium, the product will contain molecules of magnesium halides which contain no hydrogen, clearly pointless. Anthracene per se is the preferred polycyclic aromatic but other polycyclic aromatics such as the fused anthracenes, tetracene and pentacene are also suitable.

Other activators may optionally also be present, such as alkyl, cycloalkyl and/or aryl tertiary amines, e.g. triethyl amine, tributyl amine, pyridine, and the like. Alkyl halides such as ethyl bromide, which form Grignard reagents with the magnesium, are also useful activators and speed up the process. Advantageously, the alkyl radicals have up to 10 carbon atoms and preferably up to 4 carbon atoms, the cycloalkyl radical up to 10 carbon atoms, and the aryl radical is preferably phenyl or naphthyl.

In accordance with the invention, the magnesium halide, the transition metal halide, the anthracene and the activator, if present, may be used in catalytic quantities, e.g. about 1:10–1:10$^4$, the latter having reference to Mg. However, if desired, these components can be present in much larger proportions relative to Mg, e.g., magnesium halides can be employed in stoichiometric amount (or even more) relative to Mg.

The operating temperature may range from 0° to 200° C., advantageously 0° to 150° C., and preferably room temperature to 80° C., at from about 1 to 300 bar, preferably about 40 to 140 bar.

The hydrogen gas may be substantially pure or it may be present in admixture with other gases which are inert under the prevailing conditions, e.g., nitrogen, methane, homologs of methane, noble gases, and the like, or which are moderate reactive and present in small amounts under the prevailing conditions, e.g., carbon monoxide, carbon dioxide, oxygen, water vapor, ammonia, and hydrogen sulfide, and the like. In the latter case, part of the hydrogen capacity of the active magnesium is reduced.

The process in accordance with the invention makes possible for the first time the industrial production of highly reactive magnesium hydrides including soluble halomagnesium hydrides from magnesium and hydrogen under mild conditions. Magnesium hydride is of great importance as a hydrogen store since it contains 7.66 wt. % of hydrogen which can be split off at elevated temperatures with reverse formation of elemental magnesium. [See D. L. Cummings and G. J. Powers, Ind. Eng. Chem., Process Des. Develop. 13, 182 (1974)].

While hydrogenation of the magnesium can be carried to completion, viz. all of the magnesium is converted to MgH$_2$, it can be terminated sooner and it is another advantage of the invention that more than 50% of the magnesium can be converted to the hydride relatively rapidly.

The magnesium hydrides produced by the process in accordance with the invention as a hydrogen store are superior to magnesium hydrides produced by prior art methods. [See also M. H. Mintz et al, J. Inorg. Nucl. Chem. 40, 765 (1978)]. Thus a sample (15.8 g) of the magnesium hydride prepared by the use of CrCl$_3$ as a catalyst component at 20° C. was quantitatively dehydrogenated within 40 min. at 300° to 315° C. and 1 mm Hg. (Release of 11.5 l H$_2$ at 1 bar and 20° C.) The highly active magnesium powder so obtained again reacts with hydrogen already under small partial pressure of hydrogen at relative mild conditions of temperature and pressure, below 300° C. or even below 150° C. and below 50 bar or even at 1–3 bar, the formation of magnesium hydride being practically completed within 30 min. (Absorption of 11.5 l H$_2$ at 1 bar and 20° C.) The hydrogenation/dehydrogenation process may be repeated several times without appreciable variations occurring in the rate or in the H$_2$ storage capacity, or in the high quality of the pure hydrogen coming out of the dehydrogenation step. Purification of hydrogen out of gas mixtures is a further application of the process.

Moreover, magnesium hydride per se or the soluble halomagnesium hydrides may be used in place of the costly LiAlH$_4$ as reducing agents. They may also be used in the synthesis of magnesium alkyls and hydrides of other metals, in the preparation of "activated" magnesium, as a dehydrating agent, a carrier for heterogeneous catalysts, and the like.

It is especially useful to effect the hydrogenation in the presence of a magnesium halide in conjunction with a transition metal hadide, especially a hadide of titanium, chromium and/or iron. The presence of magnesium halide shortens the hydrogenation time by a factor of 5 to 10. Therefore, production costs in the preparation of magnesium hydride are extremely lowered and the volume/time yield raised respectively. As an index for the increase of activity besides the raised yield the active surface of the produced magnesium hydride is increased.

The catalysts can be employed in accordance with the invention in a ratio of magnesium to transition metal of $10^4$–50:1, whereby a ratio of transition metal to magnesium-organic compound or magnesium hydride to magnesium halide of 0.1:1:2 to 10:1:20 can be selected. When, however, the operation is carried out at a high molar ratio of magnesium to transition metal (e.g. $5 \times 10^2$:1), a molar ratio of magnesium halide to transition metal that is even higher than 20:1 (like 50:1 or 100:1 e.g.) can also be selected.

European Pat. No. 0 003 564 employs magnesium halide in stoichiometric amount relative to magnesium for hydrogenation. Examples 35 to 42 hereinbelow illustrate the advantages of only catalytic quantities of magnesium halide.

It takes 1.5 to 2 hours (Example 35) to quantitatively hydrogenate 50-mesh magnesium powder by the instant method at 60° to 64° C. and a hydrogen pressure of 60 bars with a molar ratio of magnesium to titanium to anthracene to MgCl$_2$ of 100:1:1:8.7 (for a titanium or anthracene concentration of 0.05 moles/l). By the method described in European Pat. No. 0 003 564, however, subject to the same conditions but without the addition of catalytic amounts of MgCl$_2$ (comparative test, Example 35), it takes about 20 hours to completely hydrogenate the magnesium. When the magnesium is hydrogenated by the instant method subject to the conditions described in Example 35 but employing 270-mesh magnesium powder, hydrogenating time is decreased to 45 minutes. Increasing hydrogen pressure from 60 to 120 bars decreases the hydrogenating time of 50-mesh magnesium powder from 1.5–2 hours to 1 hour (Example 35 or 37). As comparison of Examples 35 and 38 indicates, the rate of hydrogenation increases as temperature is increased from 40° to 60° C.

The properties of the magnesium hydride obtained by the instant method are definitely better than those of the magnesium hydride obtained by the method described in European Pat. No. 0 003 564. As measured by BET, the specific surface of the magnesium hydride prepared as described in Example 35 or 36 herein is 129.4 m$^2$/g as against 70 to 90 m$^2$/g for the magnesium hydride obtained subject to the same conditions but without the addition of magnesium halides. The magnesium hydride prepared by the instant method will accordingly be preferred for chemical purposes (synthesizing magnesium alkyls and metal or element hydrides, preparing "active magnesium," reducing or drying agents, and carriers for heterogeneous catalysts) and to store, purify, or separate hydrogen.

All the tests described in the examples were carried out in a protective argon atmosphere.

EXAMPLE 1

(a) A suspension of 97.2 g (4.0 moles) of magnesium powder (50 mesh) in 400 ml abs. THF is mixed with 1.0 ml of ethyl bromide, and after half an hour's stirring with 8.0 g (45 mmoles) of anthracene. After 3 hours' stirring of the mixture (formation of magnesiumanthracene), 7.0 g (44 mmoles) of CrCl$_3$ is added, stirring then being continued for 25 to 30 min. The olive-green suspension is then hydrogenated in a 2-liter autoclave with agitator at 52° C. and an initial pressure of 135 bars hydrogen. After a reaction time of 5 hr., the hydrogen pressure is 92 bars, and after 8 hr., 82 bars; and after a total reaction time of 20 hr. the pressure remains constant at 72 bars. The pressure loss corresponds to an uptake of 100 l of hydrogen, or a quantitative conversion of Mg to MgH$_2$. The magnesium hydride may be separated from the catalyst solution by filtration of the suspension obtained, and may then be obtained in solid, pyrophoric form by washing with THF and pentane or drying under vacuum. Yield: Quantitative.

(b) To show its beneficial effects, the activator ethyl bromide is omitted, the process being re-run as follows:

A suspension of 97.2 g (4.0 moles) of magnesium powder (50 mesh) in 400 ml abs. THF is mixed with 8.0 g (45 mmoles) of anthracene. After 10–12 hours' stitting of the mixture (formation of magnesium anthracene) 7.0 g (44 mmoles) of CrCl$_3$ are added, stirring then being continued for 30 min. The olive-green suspension is then hydrogenated as described in (a) 1. The absorption of hydrogen up to the complete hydrogenation of the magnesium develops as described there.

It takes much longer to form the magnesium anthracene which is an essential ingredient during hydrogenation. Once it is formed the hydrogenation after the addition of the transition metal halide is unchanged as far as speed and yield are concerned.

The time of formation of the magnesium anthracene without the addition of ethyl bromide or iodine can be reduced below the three hours described in (a), if the magnesium powder is heated in vacuum (0.1 mbar) before the addition of THF.

EXAMPLE 2

97.2 g (4.0 moles) of magnesium powder in 250 ml of abs. THF is introduced into a 2-liter autoclave with agitator and activated by the addition of 0.4 g of iodine. A suspension of 3.8 g (19 mmoles) of magnesiumanthracene and 0.5 g (20 mmoles) of magnesium powder in 180 ml THF is mixed with a solution of 3.0 g (17.5 mmoles) FeCl$_3$ in 20 ml THF, the mixture is stirred for 20 min. and then added to the contents of the autoclave. The mixture is hydrogenated at 52° C. and an initial pressure of 120 bars hydrogen. After a reaction time of 24 hr., the hydrogen pressure is 80 bars, and after 48 hr. the hydrogen pressure remains constant at 62 bars. The pressure drop corresponds to a total uptake of 4.3 moles of H$_2$, or complete conversion of the Mg to MgH$_2$.

EXAMPLE 3

A suspension of 4.86 g (0.2 mole) of magnesium powder (50 mesh) in 50 ml abs. THF is mixed with 0.05 ml of ethyl bromide, and after half an hour's stirring with 0.36 g (2.0 mmoles) of anthracene. After 3 hours' stirring of the mixture (during which time magnesiumanthracene is formed, as is apparent from the separation of the orange precipitate), 2.0 mmoles of the particular transition-metal compound (see Table) is added to the suspension, followed by stirring for another 15 to 20 min. The reaction vessel is filled with hydrogen at normal pressure and the hydrogen uptake is measured at 20° C. with vigorous stirring by means of a gas burette. The hydrogen uptake proceeds at a nearly constant rate over several days. The data on the amounts of $H_2$ taken up after 48 hr. and on the percent conversion to $MgH_2$ are presented in the Table.

TABLE

| Example | 3 | 4 | 5 | 6 | 7 | 8 | 9 | 10 | 11 |
|---|---|---|---|---|---|---|---|---|---|
| Transition-metal compound | $CrCl_3$ | $FeCl_3$ | $FeAcac_3$* | $TiCl_4$ | $VCl_4$ | $MoCl_5$ | $MnCl_2$ | $CoCl_2$ | $NiCl_2$ |
| g (2.0 mM) | 0.32 | 0.32 | 0.71 | 0.38 | 0.39 | 0.56 | 0.25 | 0.26 | 0.26 |
| $H_2$ uptake after 48 hr. (ml) | 2000 | 1500 | 300 | 1300 | 500 | 700 | 950 | 250 | 200 |
| Percent converted to $MgH_2$ after 48 hr. | 42 | 31 | 6 | 27 | 10 | 15 | 20 | 5 | 4 |

*Acac = acetyl acetonate

EXAMPLES 12–15

Examples 12–15 are carried out analogously to Example 4, the molar ratio of $FeCl_3$ to magnesiumanthracene being varied from 1:0.5 to 1:10. The figures for the amounts of $H_2$ taken up after 48 hr. and for the percent converted to $MgH_2$ are presented in the Table which follows.

| Example | 12 | 4 | 13 | 14 | 15 |
|---|---|---|---|---|---|
| $FeCl_3$ g (mM) | 0.32 (2.0) | 0.32 | 0.32 | 0.32 | 0.32 |
| Anthracene g millimoles | 0.18 (1.0) | 0.36 (2.0) | 0.71 (4.0) | 1.42 (8.0) | 3.6 (20.0) |
| $H_2$ uptake after 48 hr. (ml) | 850 | 1,500 | 850 | 900 | 1,300 |
| Percent converted to $MgH_2$ after 48 hr. | 18 | 31 | 18 | 19 | 27 |

EXAMPLES 16–18

Examples 16–18 are carried out analogously to Example 4, the mixtures being mixed with 10 millimoles of an amine (see Table) prior to introduction of the hydrogen. The figures for the amounts of $H_2$ taken up after 48 hr. and for the percent converted to $MgH_2$ are set forth in the following table:

| Example | 16 | 17 | 18 |
|---|---|---|---|
| Amine | $(C_2H_5)_3N$ | $(CH_3)_2NCH_2CH_2N(CH_3)_2$ | 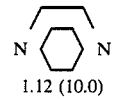 |
| g (millimoles) | 1.01 (10.1) | 1.16 (10.0) | 1.12 (10.0) |
| $H_2$ uptake after 48 hr. (ml) | 2,000 | 1,100 | 700 |
| Percent converted to $MgH_2$ after 48 hr. | 42 | 23 | 15 |

EXAMPLE 19

This experiment is carried out analogously to Example 4, a mixture of 40 ml of toluene and 10 ml of tetrahydrofuran being used as solvent. The hydrogen uptake after 48 hr.

EXAMPLE 20

This experiment is carried out analogously to Example 4, 1,2-dimethoxyethane (50 ml) being used as solvent in place of tetrahydrofuran. The hydrogen takeup after 48 hr. was 220 ml.

EXAMPLES 21–27

Examples 21–27 are carried out analogously to Example 4, the organometallic compounds (M-C) (2.0 millimoles) given in the table being used as catalyst component in place of magnesiumanthracene. The figures on the hydrogen uptake after 48 hr. are presented in the table:

| Example | 21 | 22 | 23 | 24 | 25 | 26 | 27 |
|---|---|---|---|---|---|---|---|
| M—C | $AlEt_3$ | $BEt_3$ | $ZnEt_2$ | $NaC_6H_5$ | LiBu | Na—naphth. | $Et_2AlCl$ |
| g (2.0 mM in each case) | 0.23 | 0.20 | 0.25 | 0.20 | 0.13 | 0.30 | 0.26 |
| $H_2$ uptake after 48 hr. (ml) | 550 | 520 | 570 | 400 | 570 | 450 | 300 |

EXAMPLE 28

A suspension of 0.60 g (25 millimoles) of magnesium powder in 10 ml of abs. THF is mixed with 0.02 ml of ethyl bromide, and after half an hour's stirring with 0.06 g (0.37 millimoles) of anthracene. After 3 hours' stirring, 0.06 g (0.37 millimoles) of $CrCl_3$ is added to the suspension, and after another 15 min. a solution of 4.9 g (27 millimoles) of MgBr$_2$ (anhydrous) in 120 ml of THF. The mixture is hydrogenated in a glass-lined 500-ml autoclave with agitator for 12 hr., 15° C. and 100 bars hydrogen pressure. The suspension is allowed to settle for 20 hr. Upon deuterolysis, 25.0 ml (out of a total of 130 ml) of the clear supernatant solution yielded 140 ml HD. The solution further contained a total of 1.15 g (47.4 millimoles) of Mg and 4.28 g (53.6 mg-atom) of Br. This composition corresponds to a yield of soluble HMgBr (in mixture with MgBr$_2$) of about 60%.

EXAMPLE 29

97.0 g (4.0 moles) of magnesium powder in 370 ml of abs. THF is introduced into a 2-liter autoclave with agitator and activated by the addition of 1.0 ml of ethylbromide. 2 liters (83 millimoles) of gaseous butadiene is then introduced into the suspension, and the contents of the autoclave are then heated over 1.5 hr. to 80° C. (formation of an organomagnesium compound). After cooling to room temperature, 3.2 g (19 millimoles) of FeCl$_3$ in 30 ml of THF is added to the contents of the autoclave. The mixture is hydrogenated at 20° to 22° C. and an initial hydrogen pressure of 120 bars. After a reaction time of 20 hr. the hydrogen pressure drops to 97 bars, and after 44 hrs. the pressure remains constant at 92 bars. The pressure drop corresponds to a total uptake of 2 moles of H$_2$, or a conversion of Mg to MgH$_2$ of about 50%.

EXAMPLE 30

This experiment is carried out analogously to Example 3, ($\pi$-C$_5$H$_5$)$_2$Cr (0.36 g=2.0 millimoles) being used as catalyst component in place of CrCl$_3$. The hydrogen uptake after 48 hr. is 850 ml.

EXAMPLE 31

15.2 g MgH$_2$ prepared according to Example 1 were dehydrogenated at 372° C. and normal pressure using a 300 ml stainless steel autoclave. Thereafter at 227° C. the autoclave was evacuated, and brought to a pressure of 10 bar with an 85.8–14.2 volume % CH$_4$/H$_2$-mixture. A short increase in temperature to 231° C. was noticed. After 1.2 hours at 227° C. the autoclave was depressurized and the released gas analyzed: 1.9 Vol.% H$_2$, 98.1 Vol.-% CH$_4$. This hydrogen content corresponds almost to the calculated equilibrium vapor pressure of the hydrogen above magnesium hydride at 227° C. (calculated 1.5 Vol.-% H$_2$).

Hydrogenation of the active magnesium using the CH$_4$/H$_2$-mixture was conducted in 36 steps in order to demonstrate the capacity of the active magnesium. The temperature was kept constant, pressure and contact time were varied according to the data of the following table, the autoclave being de-pressurized and the residual gas being analyzed after each step:

| Hydrogenation Step | Pressure (bar) | Hydrogenation Time (h) | Mole % H$_2$ in residual gas |
|---|---|---|---|
| 2. | 10 | 2.4 | 2.6 |
| 3. | 10 | 0.33 | 4.1 |
| 4. | 10 | 12.0 | 2.4 |
| 5. | 15 | 1.6 | 1.9 |
| 6. | 15 | 0.33 | 2.6 |
| 7. | 15 | 4.0 | 1.4 |
| 8. | 15 | 12.0 | 1.2 |
| 9. | 15 | 1.5 | 2.1 |
| 10. | 15 | 1.5 | 2.3 |
| 11. | 15 | 1.5 | 2.2 |
| 22. | 15 | 1.5 | 9.8 |
| 37. | 15 | 1.5 | 12.5 |

After cooling the autoclave to room temperature and evacuating to 0.1 millibar the autoclave was heated to 363° C. whereby during 1 hour 9.32 l gas (20° C./1 bar) were collected. After the start and before the end of the gas development a gas sample was analyzed. Each analysis confirmed 100% H$_2$. From the amount of H$_2$ released it was calculated that 66% of the magnesium had been converted to MgH$_2$.

EXAMPLE 32

Repeating Example 31, but using a hydrogenation temperature of 196° C., a pressure of 15 bars and 14.3 g of the original MgH$_2$, the magnesium was hydrogenated in 23 independent steps, each lasting 2 hours. The H content of the residual gas can be seen from the following table:

| Hydrogenation Step | Mole % H$_2$ in residual gas |
|---|---|
| 1. | 0.7 |
| 2. | 0.6 |
| 11. | 1.4 |
| 13. | 2.7 |
| 23. | 12.6 |

After dehydrogenation at 362° C. there were collected 8.46 l gas (20° C./1 bar) consisting of 100% H$_2$. This corresponded to 60% of the magnesium having been converted to MgH$_2$.

EXAMPLE 33

17 g of a MgH$_2$ prepared according to Example 1 were dehydrogenated at 330° C./normal pressure (11 l H$_2$ at 20° C.) to form an active magnesium.

Thereafter hydrogen containing 1 mol% CO were pressed on the active magnesium up to a pressure of 10 bar, keeping this pressure during the hydrogenation. The temperature varied between 373° and 330° C. during 70 minutes. 12.5 l (20° C./1 bar) hydrogen were absorbed. Cooling the autoclave to room temperature and releasing the residual pressure the gas above the formed MgH$_2$ contained 89 mol% H$_2$ and 8 mol% CH$_4$. The amount of methane formed corresponds to the amount of carbon monoxide present in the absorbed amount of H$_2$. Dehydrogenation at 0.2 mbar and 338° C. during 70 min. 13.3 l (20° C., 1 bar) of pure hydrogen are formed.

Hydrogenation with a hydrogen/CO-gas mixture of the active magnesium and dehydrogenation as described were repeated 27 times. During hydrogenation the temperature went up to 370°–373° C. while during dehydrogenation the temperature decreased to about 300° C. After the 7th, 13th, 25th, 27th dehydrogenation the respective amounts of gas released were 11.3, 10.5, 8.8, and 8.5 l (20° C., 1 bar) of H$_2$. The gas after the 27th dehydrogenation step was still pure hydrogen. After this number of cycles the capacity of the MgH$_2$ battery was reduced to 70% compared with the original sample.

EXAMPLE 34

16 g of magnesium hydride prepared according to Example 1 were dehydrogenated in a 300 ml stainless steel autoclave in a vacuum at 0.2 mbar by slowly raising the temperature of the autoclave (about 2° C. per minute) to 373° C. At about 270° C. the evolution of gas starts. 12.8 l gas (20° C., 1 bar) were developed. The active magnesium so produced was hydrogenate at 338° C. and 10 bar by a $H_2/CO$-gas mixture containing 2.3 mol% CO. Keeping the pressure constant, temperature shortly went up to 366° C. and dropped thereafter during 1.5 hours back to 338° C. The residual gas in the autoclave (11.2 l, 20° C., 1 bar) contained 82.9 mol% $H_2$, 15.8 mol% $CH_4$, rest $N_2$. Thereafter the autoclave was cooled to room temperature evacuated and thereafter the formed $MgH_2$ at 340° C./normal pressure dehydrogenated. 11.2 l (20°, 1 bar) of pure $H_2$ were obtained.

Repeating hydrogenation (hydrogen containing 2.3 mol% CO) and dehydrogenation further 25 times after the 8th, 12th, and 26th dehydrogenation 5.9, 4.9, and 2.4 l (20° C. and 1 bar) respectively hydrogen were formed.

EXAMPLE 35

48.6 g (2.0 moles) of magnesium powder (50 mesh) and 3.56 g (20.0 mmoles) of anthracene were placed in a 1-l flask and 370 ml of a 0.47 molar $MgCl_2$ solution in absolute THF (tetrahydrofuran; 174 mmoles; anthracene:$MgCl_2$=1:8.7; $MgCl_2$ solution prepared from magnesium powder and 1,2-dichloroethane in THF) and 0.3 ml of ethyl bromide added. After 5 to 10 minutes of stirring the suspension took on a deep-blue coloration. After 15 minutes of stirring the suspension was treated with 6.7 g (20.0 mmoles) of $TiCl_4$ 2 THF, whereupon heat tonality and a color change toward dark brown occurred, and stirred for another 15 minutes at room temperature. The suspension was poured into a 1 liter special-steel autoclave equipped with a blade agitator, thermosensor, and thermostating device, the contents heated to 45° C., and hydrogen pumped in from a pressurized supply container through a pressure-reducing valve until the pressure was 60 bars. The exterior autoclave temperature was increased to 60° C. and the contents of the autoclave isobarically hydrogenated at a stirring speed of 900 min$^{-1}$ and a hydrogen pressure of 60 bar. The temperature of the reaction mixture and the hydrogen uptake (as mentioned by the pressure drop in the supply container) was graphed during the test on a two-channel recorder. The temperature of the reaction mixture increased temporarily to 64° C. as hydrogenation commenced and decreased to 60° C. as hydrogenation continued. After 1.5 to 2 hours the hydrogenation process was terminated and hydrogen uptake quantitative. The suspension of $MgH_2$ was filtered, the filter cake washed twice with THF and twice with pentane, and the magnesium hydride dried in a high vacuum at 20° C.

Yield: 45.0 g of $MgH_2$.
Composition: Mg 82.5, H 7.1, C 2.8, Cl 2.2, Ti 0.5%.
Specific powder surface (BET): 129.4 m$^2$/g.

It should be noted that the filtrate can be employed with the dissolved catalyst (without washing liquid) to hydrogenate another charge of magnesium with the same results. Subsequent to two hydrogenations, the hydrogenating action of the catalyst solution will of course become weak.

A comparative test of the hydrogenation of magnesium was conducted analogously and with the same amounts of materials but without the addition of $MgCl_2$ (as known from European Pat. No. 0 003 564). Hydrogenation took 20 hours.

EXAMPLE 36

The test was conducted as in Example 35 and with the same amounts of material but with 270-mesh magnesium powder. The hydrogenation process was terminated after 45 minutes.

Yield: 44.8 g of magnesium hydride.
Comp.: Mg 81.8, H 7.3, C 5.2, Cl. 4.5, Ti 1.0%.
Specific surface: 129.4 m$^2$/g.

EXAMPLE 37

The test was conducted as in Example 35 and with the same amounts of material but at a hydrogen pressure of 120 bar. Hydrogenation took 1 hour.

EXAMPLE 38

The test was conducted as in Example 35 and with the same amounts of material but at a temperature of +40° C. (±2°) instead of 60° to 65° C. The hydrogenation process was terminated after 7 hours.

EXAMPLE 39

The test was conducted as in Example 35 and with the same amounts of material but with the concentration of $MgCl_2$ in the THF solution decreased to 0.35 moles/l (130 mmoles of $MgCl_2$; anthracene:$MgCl_2$=1:6.5). Hydrogenation took 4.7 hours.

EXAMPLE 40

The test was conducted as in Example 35 and with the same amounts of material but at a concentration of 0.27 mole/l of $MgCl_2$ in THF (100 mmoles of $MgCl_2$; anthracene:$MgCl_2$=1:5). Hydrogenation took 7.5 hours.

EXAMPLE 41

The test was conducted as in Example 35 and with the same amounts of material although $CrCl_3$ (3.2 g, 20.0 mmoles) was employed as a catalyst component instead of $TiCl_4$ 2 THF. Hydrogenation took 2 hours.

EXAMPLE 42

The test was conducted as in Example 35 and with the same amounts of material although $MgBr_2$ was employed in a concentration of 0.25 moles/l (90 mmoles of $MgBr_2$; anthracene:$MgBr_2$=1:4.6) as a catalyst component instead of $MgCl_2$. Hydrogenation took 12 hours.

EXAMPLE 43

55.5 g (2.2 moles) of magnesium powder (50 mesh) was placed in 370 ml of absolute THF. 16.4 ml (0.2 moles) of 1,2-dichloroethane was dropped into the suspension while it was being stirred, with a lot of ethylene developing. The batch was stirred for 15 minutes, the dissolved ethylene pumped off, and the suspension treated with 3.50 g (20 mmoles) of anthracene. Subsequent to 5 to 10 minutes of stirring the suspension turned dark blue. After 15 minutes of stirring it was treated with 6.7 g (20 mmoles) of $TiCl_4$ 2 THF and processed further as described with reference to Example 1. Hydrogenation took 4 hours. The yield and properties of the magnesium hydride are identical to those mentioned with reference to Example 35.

EXAMPLE 44

The test was conducted as in Example 35 and with the same amounts of material but at a hydrogen pressure of 40 bar. Hydrogenation took 5.2 hours.

EXAMPLE 45

The test was conducted as in Example 35 and with the same amounts of material but at a hydrogen pressure of 20 bar. Hydrogenation took 9 hours.

It is understood that the specification and examples are illustrative but not limitative of the present invention and that other embodiments within the spirit and scope of the invention will suggest themselves to those skilled in the art.

I claim:

1. A process for the production of magnesium hydride which comprises reacting magnesium with hydrogen in an organic solvent in the presence of anthracene and a halide of a transition metal of the IVth to VIIIth sub group of the periodic system.

2. A process according to claim 1, wherein the reaction is carried out under a pressure from about 1 to 300 bar.

3. A process according to claim 1, wherein the transition metal halide is a halide of titanium, iron and/or chromium.

4. A process according to claim 1, wherein the solvent comprises tetrahydrofuran, toluene, 1,2-dimethoxyethane, or mixtures thereof.

5. A process according to claim 1, wherein a magnesium halide is added to the solvent and is present during the reaction with hydrogen.

6. A process according to claim 1, including the further steps of dehydrogenating the resulting magnesium hydride at elevated temperature thereby to produce activated magnesium, and contacting the activated magnesium with a hydrogen-containing gas to re-form magnesium hydride.

7. A process according to claim 6, wherein the hydrogen is employed as a gaseous mixture with at least one other gas which is inert under the prevailing conditions.

8. A process according to claim 6, wherein the hydrogen is employed as a gaseous mixture with at least one member selected from the group consisting of nitrogen, methane, carbon monoxide and ammonia.

9. A process according to claim 1, wherein the solvent comprises tetrahydrofuran, the reaction is carried out a pressure of at most 140 bar and a temperature of about 20° to 80° C., and the ratio of each transition metal halide and of anthracene to magnesium 1:10 to $1:10^4$.

* * * * *